April 9, 1968
W. F. NEWBOLD
3,377,548
PROCESS CONTROLLER PROVIDING RAPID OR GRADUAL
VARIATIONS IN ITS OUTPUT SIGNAL
Filed March 4, 1966
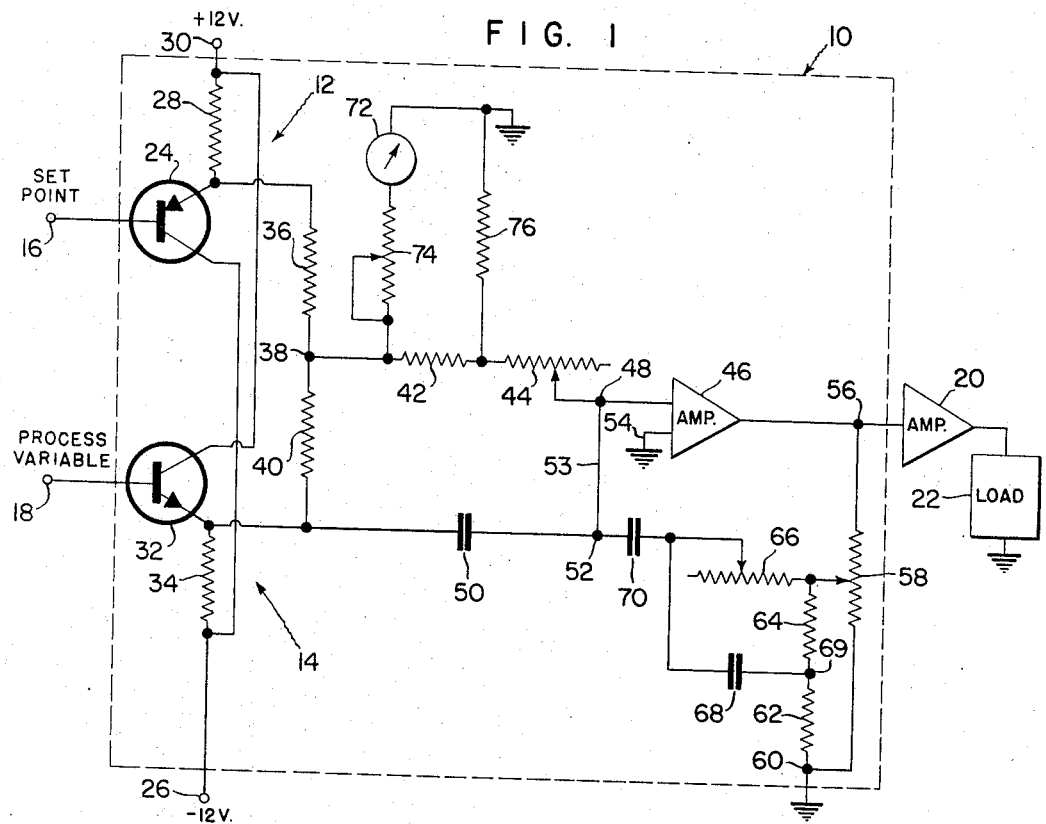
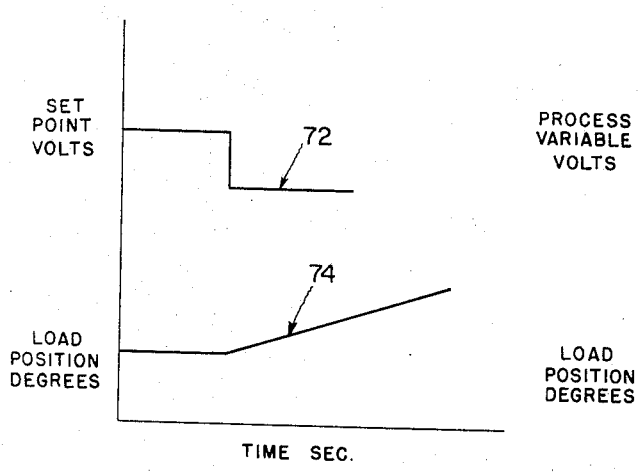
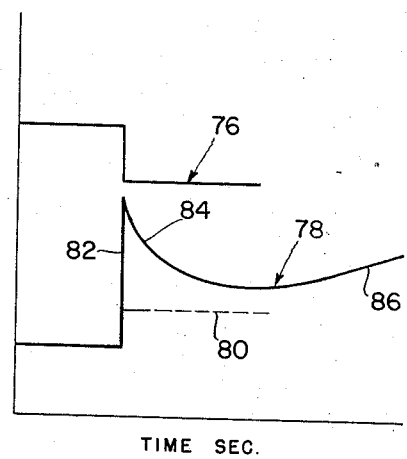
*INVENTOR.*
WILLIAM F. NEWBOLD
BY
ATTORNEY.

United States Patent Office 3,377,548
Patented Apr. 9, 1968

3,377,548
PROCESS CONTROLLER PROVIDING RAPID OR GRADUAL VARIATIONS IN ITS OUTPUT SIGNAL
William F. Newbold, Springfield Township, Montgomery County, Pa., assignor to Honeywell Inc., Minneapolis, Minn., a corporation of Delaware
Filed Mar. 4, 1966, Ser. No. 531,718
12 Claims. (Cl. 323—100)

The present invention relates to a process controller. More particularly, the invention relates to a process controller having two input signals, process variable and set point, wherein a deviation of the process variable from the set point causes a characterized proportional change in the process controller output signal, and a manual adjustment of the set point causes a gradual change in the output signal.

A general object of the present invention is to provide a process controller with a circuitry capable of producing a characterized output signal upon introduction of a deviation between the process variable and the set point while also being capable of producing a gradually changing output signal, devoid of said characterized feature, upon manual adjustment of the set point.

The process controller of the present invention is a novel apparatus which receives a signal from an automatic sensor, compares that signal against a received set point signal for establishing an error signal, and provides an output signal for controlling a final control element. The signal from the automatic sensor, referred to herein as the process variable signal, may represent such process components as pressure, flow rate, temperature, thickness, or any other physical, electrical, or chemical condition. The process variable and set point signals are utilized by the controller for providing an output signal which automatically adjusts a final control element such as a pump, valve, or heater, for returning the process variable to its set point and, thereby, eliminating the necessity for manual manipulation. A prior art controller generally received a deviation signal supplied by the external comparison of the process variable and the set point signals. The controller of the present invention compares these signals internally in a novel arrangement for achieving the general object of this invention. A typical prior art controller utilizes three functions for characterizing the output signal and thereby maintaining the controlled process at its set point. The first function is proportional band which in prior controllers may be considered as a function of the ratio of full-scale swing of the output signal, and in turn the final control element, to the deviation of the error signal. In single mode controllers, utilizing only the proportional band function, the deviation signal between the process variable and set point, or error signal, is never fully eliminated, since it is virtually impossible to reduce the deviation to zero with a single more controller. This inherent deviation between the actual process condition and the desired process condition is called "droop" and may be reduced by the use of a high gain amplifier. In many single mode controllers the high gain amplifier produces instability and therefore a second function, reset, is introduced to minimize the amount of droop and allow the use of an amplifier having a higher gain than otherwise possible. The reset function operates after the proportional band function for establishing a characterized output signal which slowly returns the final control element to the desired position. The reset function may be considered as a characterization of the output signal in accordance with the time integral of the error signal. The greater the extent of deviation of the process variable from the set point the greater will be the speed at which the reset function proportionally adjusts the final control element for subsequently returning the process variable to the set point. In the situation where the deviation of the process variable from the set point is a rapid one, the utilization of the proportional band and reset functions alone will not produce a sufficient output signal for rapidly adjusting the final control element. To overcome this problem a third function, rate, is introduced into the control circuitry of the process controller. The rate function in prior art controllers may be considered as a means for producing an output signal which is a function of the rate of change of the error signal. It compares the rate of speed at which the process variables changes from the set point and momentarily delays the passage of a feedback signal to the amplifier for permitting the controller to produce a characterized output signal of disproportionate magnitude thereby producing a rapid shift in the position of the final control element. A typical example of a prior art controller incorporating the proportional band, reset, and rate modes may be found in my U.S. Patent 3,081,425 which issued Mar. 12, 1963 and is assigned to the common assignee.

Accordingly, one object of the present invention is to provide a process controller with an improved means for controlling a final control element through the improved utilization of the proportional band, reset, and rate functions of that controller.

Another object of the present invention is to eliminate the proportional band and rate functions from the characterized output of the process controller when the set point thereof is manually adjusted and to include said proportional band and rate functions when the process controller senses a variation of the process variable.

A further object of this invention is to provide a process controller with a unique arrangement which allows the controller to maintain a fine control over the process while nevertheless allowing for a manual adjustment of the process controller set point which will not disturb the finely balanced condition within the process.

A still further object of the instant invention is to provide a safety feature within a process controller for preventing the careless adjustment of the controller set point which otherwise could cause unwanted deviations within the process being controlled.

Other objects and advantages, along with a better understanding of the present invention, may be had from the following detailed description when considered in connection with the accompanying drawings, in which:

FIG. 1 is a schematic diagram representing a controller embodying the present invention;

FIG. 2 is a graphical representation of the displacement of the final control element when the set point of the process controlled is adjusted manually; and FIG. 3 is a graphical representation of the displacement of the final control element when the process variable signal deviates from its associated set point.

Referring to FIG. 1, a process controller is shown generally at 10 having a pair of set point and process variable preamplifiers 12 and 14 connected respectively to a controller set point input terminal 16 and a controller process variable input terminal 18. The output of the process controller is connected through a load amplifier 20 to a final control element, represented as load 22, which in turn may be connected to ground. The set point input terminal 16 connects to the base of a PNP transistor 24 having its collector connected to a power supply terminal 26, maintained at −12 volts, and its emitter series connected through a resistor 28 to a second power supply terminal 30, maintained at +12 volts. The process variable input terminal 18 connects to the base of NPN transistor 32 whose emitter is series connected through a resistor 34 to the power supply terminal 26 and whose collector is connected to the power supply terminal 30.

The junction between the emitter of transistor 24 and resistor 28 is connected through resistor 36 to a summing junction 38, while the similar junction between the emitter of transistor 32 and the resistor 34 is connected through a resistor 40 to the same summing junction 38. A resistor 42 is serially connected between the summing junction 38 and a variable reset resistor 44 whose slidearm connects to an amplifier 46 through a second summing junction 48. The emitter of the transistor 32, while connected to resistor 40 and first summing junction 38, also connects to an electrode of a capacitor 50 whose opposite electrode connects to a junction point 52 which is electrically maintained at the same potential as the summing junction 48 by a jumper 53 connected therebetween. The amplifier 46 is a high gain electronic direct current amplifier having an input stage connected to the summing junction 48 which is maintained at a zero potential by a ground connection 54, also connected to the input stage of the amplifier 46. The zero potential may be replaced by any suitable reference source without departing from the scope of this invention. The output of the high gain amplifier 46 is series connected through a junction point 56 to the load amplifier 20. The junction point 56 is connected to one terminal of an adjustable proportional band potentiometer 58 having a second terminal series connected to a junction 60 and then to ground. Voltage dividing resistors 62 and 64 are series connected between the junction 60 and the slidearm of the potentiometer 58. The slidearm of the potentiometer 58 also connects to a variable rate resistor 66 whose slidearm is connected to an electrode of a capacitor 68. The second electrode of the capacitor 68 is connected to the junction point 69 between the series connected resistors 62 and 64. The slidearm of the variable rate resistor 66 is also connected to an electrode of a capacitor 70 having an opposite electrode connected to the junction point 52 thereby completing the circuit. The capacitor 70 combines with the capacitor 50 for forming a voltage dividing arrangement wherein the reset function is established in combination with the variable resistor 44 in a manner to be hereinafter described.

A deviation meter 72 is provided for indicating the deviation between the process variable and the set point signals. The first terminal of the deviation meter is connected through a variable resistor 74 to the summing junction 38, while the second terminal thereof connects to ground and through resistor 76 to a junction point between the series connected resistors 42 and 44.

The circuitry defined by the potentiometer 58, variable resistor 66, voltage dividing resistors 62 and 64, and capacitors 68 and 70 forms a feedback network through which the output signal from the amplifier is fed for maintaining the summing junction 48 at zero potential and thereby forming a current summing operational amplifier configuration. The internal circuitry of the amplifier may be one of several configurations. An example of one such configuration, suitable for application within the present invention, is shown in my Patent No. 3,081,425 referred to hereinabove. The operation of the feedback network thus far described and that part of it immediately following is more fully described in my Patent No. 3,081,425.

In operation of the negative voltage applied to the power supply terminal 26 and the positive voltage applied to the power supply terminal 30 maintains the transistors 24 and 32 in a conductive state. The potential on the input terminal 16 varies from 0 to −4 volts; the potential on input terminal 18 varies from 0 to +4 volts. When the process variable equals the set point their input signals are of equal and opposite potential. Therefore, a balanced condition between the set point and process variable signals causes a zero potential at the first summing junction 38 and, subsequently, at the second summing junction 48. When the set point is manually varied the potential at terminal 16 also varies, for example from −2 to −3 volts, thereby placing a more negative potential upon the base of the transistor 24 whereby the potential at the emitter thereof also becomes more negative. This increased negative potential is applied to the summing junction 38. The negative potential of summing junction 38 has a negligible effect on the emitter of transistor 32 due to the presence of a low impedance at the point. That is, in the illustrative example herein, a potential change at the summing junction 38 is fully dropped across the resistor 40 and the current which flows through the collector and emitter of the transistor 32 has effectively no resistance through which it passes for generating a potential drop. Therefore, assuming the signal from the process variable input terminal 18 does not change, the potential at the emitter of transistor 32 is essentially that at the power supply terminal 30 and is uneffected by the change of potential at the summing junction 38. However, the negative potential impressed upon the summing junction 38 causes a current flow from the summing junction 48 thereto through the reset resistor 44 which has a tendency to lower the potential at junction 48. The summing junction 48 is referenced to a zero potential due to the presence of the high gain amplifier 46. Therefore, the current flow from the summing junction 48 will not change the potential at that junction but will charge one plate of the capacitor 70 for causing a change in potential thereacross. There is no change of the condition of capacitor 50 since the potential did not charge at the emitter of transistor 32, as described hereinabove, and the potential at junction 52 is retained at zero by the amplifier 46. To retain the summing junction 48 at zero potential the amplifier must produce an output signal for cancelling the potential developed across the capacitor 70. This signal is fed back through the junction point 56, the potentiometer 58, variable resistor 66, and applied to the opposite plate of the capacitor 70. The output signal from the amplifier 46 is also transmitted through the load amplifier 20 to the final control element, represented as load 22, for controlling the position thereof. In the present embodiment the resistance of the variable resistor 44 is relatively large. Therefore, as long as a difference between the set point and process variable signals exists, the error signal caused thereby will be applied to the input stage of the amplifier for causing a gradually changing output. The slope of this gradually changing amplifier output, reset, is governed by the capacitor 70 and resistor 44 and is adjusted through use of the variable resistor 44. Due to the gradual change in the amplifier output signal, the rate and proportional band functions within the feedback network do not effect the amplifier feedback signal and are essentially eliminated therefrom when the set point signal is manually adjusted.

FIG. 2 is a graphical representation showing the relation between the set point and the final control, or load, when the former is manually adjusted. The axis of abscissas represents time in terms of seconds while the axis of ordinates represents the final control element, or load position, in terms of degrees and the set point in terms of volts. As seen in the curves of FIG. 2 a change in the set point voltage from −2 to −3 volts, curve 72, produces a gradual increase in the load position, termed reset. This reset curve is illustrated at 74. This function may be written mathematically as follows $$K' \int e\, dt$$

where $K'$ is a constant, $e$ is the difference between the set point and process variable signals, and $dt$ is the time differential increment.

Referring again to FIG. 1, when the set point signal is established and the process variable undergoes a change, for example a step change from +2 to +1 volts, the transistor 32 becomes less conductive thereby providing a decreased potential through its emitter. This decreased potential is applied to the summing junction 38 for reducing the potential thereon and causing a current to flow thereto from the summing junction 48 thereby charging the capacitor 70 and causing the high gain amplifier 46 to produce gradually changing negative feedback, as described hereinabove. The decreased potential is also applied through the capacitor 50 directly to the summing junction 48.

As described above, the high gain amplifier 46 is referenced to a zero potential and the application of a sudden negative going signal thereto causes the amplifier to produce a large negative feedback signal, which in this example is positive going. The feedback signal passes through the junction point 56, potentiometer 58, resistors 62 and 64, variable resistors 66, capacitor 68, and capacitor 70 for cancelling the potential change applied through the capacitor 50. So much of the signal which appears across the variable resistor 66 is not applied to the capacitor 70 but is shunted by the combined action of the capacitor 68 and the voltage dividing resistors 62 and 64 from the feedback path for establishing a rate amplitude. After the delay of this network, the negative feedback signal shunted through the capacitor 68 charges this capacitor through the resistor 62. This produces a decay in the amount of feedback signal shunted by the capacitor 68. As this decay takes place, the feedback signal increases for accordingly reducing the net output signal from the amplifier and returning the final control element to a position more closely aligned with the position it maintained prior to the sudden negative going signal at the process variable input terminal. At this time the reset function reestablishes its control over the final control element, as hereinabove described. It will be observed that this embodiment of the invention eliminates the comparison of process variable signal to set point signal, as in prior art controllers, and relies on the process variable signal alone to establish a rate function.

The proportional band function is established by the adjustable resistor 58. Consider for a moment the feedback between the junction point 56 and the summing junction 48 as including only the potentiometer 58 connected to the capacitor 70. An input signal through capacitor 50 to the summing junction 48 causes the high gain amplifier to produce an output signal which, when applied to the capacitor 70, is of opposite polarity and equal potential to the input signal for retaining the summing junction 48 at zero potential. The output signal, which is also supplied to the load amplifier 20, will assume whatever potential is necessary to overcome the resistance of the potentiometer 58 and reestablish a balanced condition at summing junction 48. Therefore, the adjustment of resistor 58 will cause a larger or smaller output signal from the amplifier 46 in proportion to the input signal, since the amplifier 46 retains the summing junction 48 at zero potential regardless of the amplitude of the output signal necessary to do so. The proportional band function therefore also relies on the variation of the process variable signal alone and does not compare set point and process variable signals, as in prior art controllers. Through the addition of the attenuating resistors 62 and 64 in series between the slidearm of the potentiometer 58 and ground, the rate capacitor 68, and the rate variable resistor 66 the rate function is established having an attenuating network. The attenuating resistors force the high gain amplifier 46 to produce a much greater output for rebalancing the summing junction 48. This increased output, or rate amplitude, is established by the resistance ratio of the resistors 62 and 64. For example, if resistor 62 is a 20,000 ohm resistor and resistor 64 is a 180,000 ohm resistor it can be seen that a reduction of 1 volt in potential applied across the capacitor 50 from the process variable input terminal 18 will require an output of at least 10 volts from the amplifier 46 in order to provide a 1 volt increase in potential across the capacitor 70 for rebalancing the summing junction potential. The addition of the proportional band potentiometer decreases this ratio. The variable resistor 66, in series between the slidearm of the potentiometer 58 and capacitor 70, and the addition of capacitor 68 establishes an RC network for controlling and adjusting the rate at which the rate amplitude decays.

Referring to FIG. 3 a graphical illustration of the relationship between the process variable and the final control element, or load position, is shown. The axis of abscissas represents time in seconds and the axis of ordinates represents the process variable in volts and the load position in degrees. It can be seen that a step change in the process variable signal, represented by the curve 76, will cause an instantaneous characterized change in the load position, illustrated by curve 78. This characterized curve is partially controlled by the adjustable proportional band potentiometer 58. In this function alone were available within the feedback network the load position would follow the curve indicated by the dotted line 80. The large instantaneous variation of the load position, illustrated at 82, is caused by the rate amplitude which is a portion of the rate function. The amplitude of this variation is caused by the delay of the negative feedback signal thereby causing the amplifier to produce a proportionally larger output signal in order to balance the summing junction 48. This amplitude may be adjusted by the variation of the potentiometer 58. The rapid decay of the rate amplitude, shown at 84, is controlled by the adjustable resistor 66 and capacitor 68 which comprise the RC network portion of the rate function. The decay causes the position of the final control element to return to a position approximating that which it would have assumed if only the proportional band function were available. From this point the position of the final control element gradually shifts toward the set point under the influence of the reset function, as shown at 86.

In the present invention the mathematical expression for the rate function may be written as:

$$K'' \frac{d(P.V.)}{dt}$$

where $K''$ is a constant and P.V. is the process variable. The mathematical expression for the proportional band may be written as:

$$K(P.V.)$$

where $K$ is a constant. The mathematical expression for the load position as controlled by a controller of the present invention without regard to the sign thereof may now be written in the form of the equation:

$$\text{Load position} = K(P.V.) + K' \int e\,dt + K'' \frac{d(P.V.)}{dt}$$

whereas the mathematical equation for the load position of prior art controller follows the written form:

$$\text{Load position} = Ke + K' \int e\,dt + K'' \frac{de}{dt}$$

where $e$ is the difference between the process variable and the set point as described hereinabove.

The process controller of the present invention, therefore, does not compare the process variable against the set point during the proportional band and rate functions, as in prior art process controllers. The description of FIG. 1 hereinabove has pointed out that the set point and process variable signals are compared against each other only during the reset function and, thereafter, their deviation, or error, is applied to the summing junction 48. If the system is in balance the set point and process variable signals cancel each other at the summing junction 38 for eliminating the application of a signal to the amplifier 46. The capacitor 50 effectively prevents the application of a stable process variable signal to the summing junction 48. When the set point signal is varied it changes the potential at the summing junction 38 and slowly unbalances the summing junction 48 thereby causing the amplifier 46 to produce a gradual output which retains the summing junction 48 at a zero potential and also adjusts the position of the final control element. When the process variable signal undergoes a change the signal not only changes the potential at the summing junction 38, as described above, but is also communicated directly to the summing junction 48 through capacitor 50 for producing band and rate functions. These functions, therefore, depend on the amount of increase or decrease of the process variable signal compared to a zero potential for establishing their amplitude and duration, rather than comparing the process variable to the set point for establishing an error signal, as in prior art controllers.

Accordingly, it may be seen that there has been provided a controller with means for eliminating undesirable rapid changes in load position when the set point is manually adjusted, relying only on the reset function to produce the change in final control element position, while providing for a proportional band function and rate function to complement the reset function when the process variable signal undergoes a change. This arrangement has been achieved without relying on external switching or cancelling means for removing the rate and proportional band functions from the controller circuitry.

Obviously many modifications and variations of the present invention will become obvious to those skilled in the art in the light of the above teachings, and it should therefore be understood that the embodiments described hereinabove are illustrations rather than limitations. Consequently, the present invention should be limited only by the appended claims.

What is claimed is:

1. A process controller for varying a control element in response to input signals including a first and a second input signal, comprising,
   a first summing junction,
   input means for applying said first and second input signals to said first summing junction thereby balancing one signal against the other,
   a second summing junction,
   amplifier means having an input stage and an output stage, said input stage connected to said second summing junction and to a reference source, and said output stage connected to said control element,
   feedback network means for connecting said output stage of said amplifier means to said second summing junction,
   first impedance means connecting said first summing junction to said second summing junction for allowing an unbalanced condition at said first summing junction, caused by variation of said second input signal, to gradually unbalance said second summing junction thereby producing a gradual change of said amplifier output for varying said control element and rebalancing said second summing junction through said feedback network means, and
   second impedance means connecting said input means for said first input signal to said second summing junction, circumventing said first summing junction and said first impedance, means for allowing a variation of said first input signal to rapidly unbalance said second summing junction for producing a rapid change of said amplifier output for varying said control element and rebalancing said second summing junction through said feedback network means.

2. A process controller as set forth in claim 1 wherein said first input signal is a process variable signal and said second input signal is a set point signal.

3. A process controller as set forth in claim 1 wherein said amplifier means includes a high gain electronic direct current amplifier whose reference source is a zero potential.

4. A process controller as set forth in claim 2 wherein said input means for applying said process variable and said set point signals to said first summing junction include preamplifying means and wherein said process variable and said set signals are of opposite polarity whereby said first summing junction assumes a balanced condition when said process variable signal is of equal potential and opposite polarity with said set point signal.

5. A process controller as set forth in claim 4 wherein said preamplifying means include a first transistorized means associated with said process variable signal and a second transistorized means associated with said set point signal, whereby said process variable signal from said first transistorized means and said set point signal from said second transistorized means are applied jointly to said first summing junction and said process variable signal from said first transistorized means is applied solely to said second summing junction.

6. A process controller as described in claim 2 wherein said feedback network means includes feedback impedance means for attenuating and delaying said amplifier output caused by said variation of said process variable signal being operative to delay a portion of said amplifier output from said second summing junction as a function of the rate of change of said amplifier output and thereby provide a characterized output to said control element.

7. A process controller as claimed in claim 2 wherein said first impedance means includes first resistive means and said second impedance means includes capacitive means whereby the combination thereof provides a gradual change of said amplifier output in response to said set point signal variation and further provides a characterized rapid change of said amplifier output in response to said variation of said process variable signal.

8. A process controller as set forth in claim 7 wherein said feedback network means includes capacitive means serially connected therein and said first resistive means includes a variable resistive means whereby the combination thereof provides a reset function and adjustable means therefore.

9. A process controller as set forth in claim 8 wherein said feedback network means further includes a variable resistive means for adjusting the proportional band function thereof.

10. A process controller as set forth in claim 9 wherein said feedback network means comprises said variable resistive means connected between said amplifier output and said reference source, attenuating resistive means serially connected between the adjustable arm of said variable resistive means and said reference source, a second variable resistive means connected between the adjustable arm of said variable resistive means, said serially connected capacitive means connected between said second variable resistive means and said second summing junction, and second capacitive means connected between said second variable resistive means and said attenuating resistive means thereby forming the rate function of said process controller and adjustment means for that function.

11. An electronic controller circuit comprising, in combination,
   first and second summing junctions,
   a high gain electronic direct current amplifier having a signal input circuit including said second summing junction and an output circuit,
   a negative feedback network interconnecting said output circuit and said second summing junction in a current summing operational amplifier configuration,
   input means for applying a first and a second input signal to said first summing junction thereby balancing one signal against the other,
   first impedance means connecting said first and second summing junctions,
   second impedance means connecting said input means for said first input signal to said second summing junction, and
   said feedback network including impedance means responsive to the time rate of change of signals from said amplifier, whereby the application of said first input signal passes directly to said second summing junction through said second impedance means for establishing a characterized amplifier output whose feedback to said second summing junction is delayed by said feedback network impedance means as a function of the rate of change of the output signal from said amplifier, and wherein the application of said second input signal passing from said first summing junction through said first impedance means to said second summing junction is effective when said first and second input signals are unbalanced to establish a gradually varying amplifier output.

12. A process controller for varying a control element in response to input signals received thereby including a first and second input signal, comprising:
   first and second input terminal means for receiving said first and second input signals;
   impedance means joining said first and second input terminal means;
   a first summing junction connected to a point within said impedance means joining said first and second input terminal means;
   a second summing junction;
   amplifier means having an input stage and an output stage respectively connected to said second summing junction and said control element;
   first impedance means connecting said first summing junction to said second summing junction for allowing a gradual change in either of said first or second input signals to be applied therethrough to said second summing junction for producing a gradual change in said amplifier output thereby gradually varying said control element; and
   second impedance means connecting said first input terminal to said second summing junction, circumventing said first summing junction and said first impedance means, for allowing a rapid change in said first input signal to be applied therethrough to said second summing junction for producing a rapid change in said amplifier output thereby rapidly varying said control element.

References Cited

UNITED STATES PATENTS

| | | | |
|---|---|---|---|
| 2,830,244 | 4/1958 | Davis | 318—28 |
| 3,008,072 | 11/1961 | Jenkins et al. | 318—28 |
| 3,027,520 | 3/1962 | Hinrichs | 330—147 |

JOHN F. COUCH, *Primary Examiner.*

WARREN E. RAY, *Examiner.*

A. D. PELLINEN, *Assistant Examiner.*